US011993533B2

(12) United States Patent
Burns et al.

(10) Patent No.: US 11,993,533 B2
(45) Date of Patent: May 28, 2024

(54) BUS BAR DESIGN TO ENABLE HIGH CURRENT INPUT FOR LOW RESISTIVITY GLASSES

(71) Applicant: Corning Incorporated, Corning, NY (US)

(72) Inventors: Brian Douglas Burns, Harrodsburg, KY (US); Gilbert De Angelis, Lindley, NY (US); Chunhong Chelsie He, Horseheads, NY (US); Edward Lee Kimble, III, Corning, NY (US); Yuehao Li, Painted Post, NY (US); Benjamin Pelham Schrock, Wilmington, NC (US); Matthew Nicholas Tammaro, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 503 days.

(21) Appl. No.: 17/415,778

(22) PCT Filed: Dec. 3, 2019

(86) PCT No.: PCT/US2019/064095
§ 371 (c)(1),
(2) Date: Jun. 18, 2021

(87) PCT Pub. No.: WO2020/131346
PCT Pub. Date: Jun. 25, 2020

(65) Prior Publication Data
US 2022/0064045 A1  Mar. 3, 2022

Related U.S. Application Data
(60) Provisional application No. 62/783,614, filed on Dec. 21, 2018.

(51) Int. Cl.
C03B 5/03 (2006.01)
F27D 11/04 (2006.01)
(Continued)

(52) U.S. Cl.
CPC .............. C03B 5/03 (2013.01); F27D 11/04 (2013.01); H02G 5/10 (2013.01); H05B 3/03 (2013.01); H05B 2203/025 (2013.01)

(58) Field of Classification Search
CPC .. C03B 5/00; C03B 5/027; C03B 5/03; C03B 5/04; F27D 11/04; H02G 5/10; H05B 3/03; H05B 2203/016; H05B 2203/025
(Continued)

(56) References Cited

U.S. PATENT DOCUMENTS 3,417,187 A * 12/1968 Blumenfeld ............. H05B 3/03
                                                        373/38
3,983,309 A    9/1976 Faulkner et al.
(Continued)

FOREIGN PATENT DOCUMENTS

CS        202553 B2   1/1981
JP     2006-516046 A   6/2006
(Continued)

OTHER PUBLICATIONS

Indian Patent Application No. 202117027275, First Examination Report dated Jan. 30, 2023, 6 pages Original Document; Indian Patent Office.
(Continued)

Primary Examiner — Hung D Nguyen
(74) Attorney, Agent, or Firm — Ryan T. Hardee; Grant A. Gildehaus

(57) ABSTRACT

An assembly provides electrical current to molten glass in a glass melting tank. The assembly includes a structure having an electrode that is in contact with the molten glass, and a
(Continued)

fluid-cooled connection apparatus. The fluid-cooled connection apparatus includes a first connection element electrically connected to a current source and a second connection element electrically connected to the current source, where the first and second connection elements are spaced apart from each other; and an electrical cross-connect strut having a first end secured to the first connection element and a second end secured to the second connection element. The assembly also includes a bus bar electrically connected to the fluid-cooled connection apparatus and to an electrode. The current source provides a current to the molten glass via the structure and the electrode for heating the molten glass through resistive heating.

26 Claims, 5 Drawing Sheets

(51) Int. Cl.
*H02G 5/10* (2006.01)
*H05B 3/03* (2006.01)

(58) Field of Classification Search
USPC .......................................... 373/27, 29, 36–41
See application file for complete search history.

(56) References Cited

U.S. PATENT DOCUMENTS

| | | | |
|---|---|---|---|
| 4,003,730 A | 1/1977 | Brady et al. | |
| 4,351,054 A * | 9/1982 | Olds | H05B 3/03 |
| | | | 373/40 |
| 4,468,779 A * | 8/1984 | Gillman | C03B 5/027 |
| | | | 373/36 |
| 4,544,392 A | 10/1985 | Sheinkop | |
| 7,878,047 B2 | 2/2011 | Hemblade | |
| 2006/0144089 A1 | 7/2006 | Eichholz et al. | |
| 2016/0340219 A1* | 11/2016 | Miller | C03B 5/43 |
| 2017/0088453 A1 | 3/2017 | Boughton | |

FOREIGN PATENT DOCUMENTS

| | | |
|---|---|---|
| WO | 85/00357 A1 | 1/1985 |
| WO | 2016/200788 A2 | 12/2016 |

OTHER PUBLICATIONS

European Patent Application No. 19900060.5 Search Report and Search Opinion dated Aug. 4, 2022; 8 Pages; European Patent Office.

International Search Report and Written Opinion of the International Searching Authority; PCT/US2019/064095; dated Mar. 13, 2020; 08 pages; European Patent Office.

* cited by examiner

BUS BAR DESIGN TO ENABLE HIGH CURRENT INPUT FOR LOW RESISTIVITY GLASSES

CROSS-REFERENCE TO RELATED APPLICATIONS

This application is a national stage entry of International Patent Application Serial No. PCT/US2019/064095, filed on Dec. 3, 2019, which in turn, claims the benefit of priority under 35 U.S.C. § 119 of U.S. Provisional Application Ser. No. 62/783,614 filed on Dec. 21, 2018, the contents of each of which are relied upon and incorporated herein by reference in their entireties.

FIELD OF THE DISCLOSURE

The present disclosure generally relates to methods and assemblies for resistive heating of molten glass. In particular, the present disclosure relates to providing high current to molten glass compositions that have lower resistive properties than current molten glass compositions.

BACKGROUND

A bus bar and an electrode are components used with glass melting tanks (sometimes referred to herein as "pre-melt tanks") to supply current from a current source (such as a transformer, as a non-limiting example) to the glass melt. In a conventional arrangement, the current from a current source may be delivered to the bus bar by, for example, power cables. The bus bar is typically connected to an electrode which delivers the current into the glass melt in the glass melting tank. The glass melt acts as a resistor to dissipate the current as heat energy into the glass melt through resistive heating. To complete the electrical circuit, current flows back to the current source via, for example, a second electrode, a second bus bar, and a second set of power cables.

In a conventional glass melting tank arrangement, relatively low amperage current is applied through the bus bar, such as, for example, about 1700 A (amps). The amount of current required by a glass melt is a function of the type of glass, or glass composition, being melted. However, some new glass compositions being developed have lower resistive properties than conventional glass compositions. The lower resistive properties of these new glass compositions demand that higher amperage current be applied to the glass melt in order to obtain the necessary heat generation in the glass melt. For conventional glass melting tank arrangements, the current must pass through the same electrical path of cables, bus bars, and electrodes. However, the higher amperage current causes the components in the electrical path to increase in temperature, in particular the bus bar. At certain amperage levels, the bus bar is heated to a temperature above the maximum safe operating temperature and thus may cause failure of the bus bar.

Accordingly, there is a need for improved assemblies and methods for delivering required current flow to new glass compositions in a glass melting tank. In certain, non-limiting, situations, the improved assemblies and methods enhance the current-carrying capabilities of conventional components in the electrical path for glass melting tanks.

SUMMARY

This disclosure generally relates, in various embodiments, to methods and assemblies for resistive heating of molten glass, and in certain embodiments to providing sufficient current to molten glass compositions that have lower resistive properties than current molten glass compositions.

According to certain embodiments, an assembly provides electrical current to molten glass in a glass melting tank. The assembly includes a structure having an electrode disposed so as to be in contact with the molten glass, and a fluid-cooled connection apparatus. The fluid-cooled connection apparatus includes: a first connection element and a second connection element, each in electrical communication with a current source, where the first and second connection elements are spaced apart from each other; and an electrical cross-connect strut having a first end secured to the first connection element and a second end secured to the second connection element. The assembly also includes a bus bar in electrical communication with the fluid-cooled connection apparatus and to an electrode. The current source provides a current to the molten glass via the structure and the electrode for heating the molten glass through resistive heating. In an embodiment, the fluid is water.

According to some disclosed methods, electrical current is provided to molten glass in a glass melting tank by providing a structure having a fluid-cooled connection apparatus which includes a first connection element and a second connection element, each in electrical communication with a current source, wherein the first and second connection elements are spaced apart from each other; and an electrical cross-connect strut having a first end secured to the first connection element and a second end secured to the second connection element. The provided structure also has a bus bar in electrical communication with the fluid-cooled connection apparatus and to an electrode which is disposed so as to be in contact with the molten glass. The current source is energized to provide a current to the molten glass via the structure and the electrode for heating the molten glass through resistive heating. In an embodiment, the fluid is water.

Other embodiments, additional features, and advantages of the disclosure will be set forth in the detailed description, claims, and drawings, and in part will be readily apparent to those skilled in the art. It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

DETAILED DESCRIPTION

Figure 1:
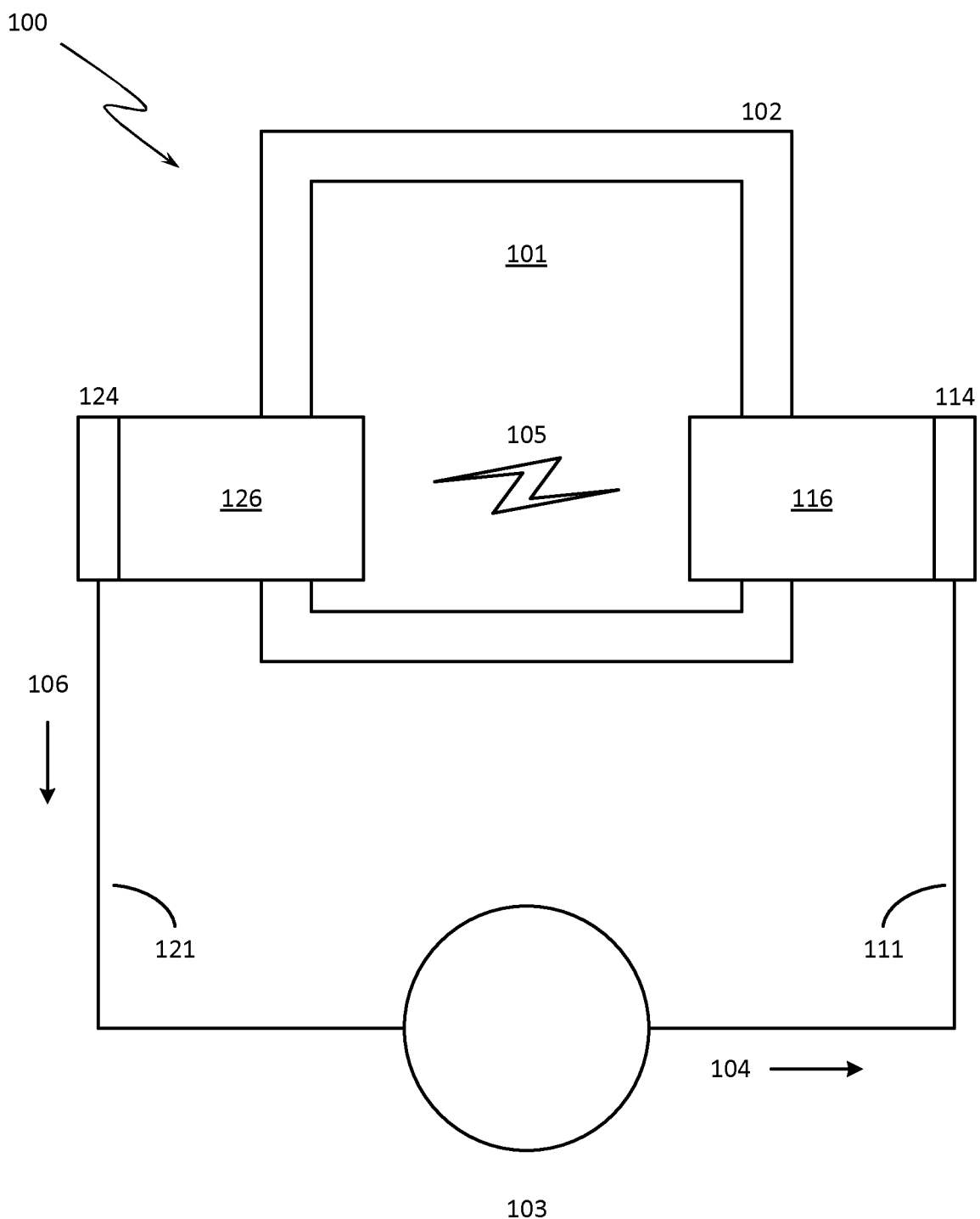
FIG. 1 is a simplified schematic of a typical glass melt tank arrangement.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof.

While the following exemplary discussion of embodiments of the present subject matter may be directed towards or reference specific assemblies and/or methods for resistive heating of a glass composition, it is to be understood that the discussion is not intended to limit the scope of the present subject matter in any way and that the principles presented are equally applicable to other systems and/or methods for resistive heating of glass compositions, such as in a glass melting tank.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of an assembly and/or method for resistive heating of molten glass are described.

The present disclosure describes novel methods and assemblies for resistive heating of molten glass, and in certain embodiments to providing sufficient current to molten glass compositions that have lower resistive properties than current molten glass compositions. Certain new glass compositions, which have lower resistive properties than current glass compositions, may require a current of greater than about 2600 A rather than the typical 1700 A for certain current glass compositions. Other new glass compositions may require even higher currents, such as greater than about 5000 A, greater than about 8000 A, and greater than about 10,000 A, including all ranges and subranges therebetween.

In a particular, non-limiting, embodiment, a glass melting tank arrangement having an electrode primarily comprised of tin and a bus bar primarily comprised of steel, should be capable of delivering current flow at about 5000 A while maintaining a temperature of the bus bar below 500° C. Based on analysis, the existing bus bar structure cannot withstand a current flow of about 5000 A without exceeding the maximum operating temperature of the bus bar of 660° C. In other embodiments, the electrode may be primarily comprised of molybdenum or may be some combination of tin and/or molybdenum and/or other materials. In still other embodiments the bus bar may include copper and/or nickel. Other glass melting tank arrangements and designs may suffer from the same lack of ability to operate at currents necessary for glass compositions with lower resistive properties, as described above. As used herein, the term "(a structure) primarily comprised of (a component)" refers to the named component comprising at least about 50% by weight, about 60% by weight, about 70% by weight, of the named structure, including all ranges and subranges therebetween.

With attention drawn to FIG. 1, a simplified schematic of a typical prior art exemplary glass melt tank arrangement 100 is shown. A volume of molten glass 101 (sometimes referred to herein as "glass melt", or "glass") is contained in a glass melt tank 102. A current source 103 (which, in an embodiment. may be a transformer) supplies input current (shown by arrow 104) via an input conductor 111 (which, in an embodiment, may be an electrical cable or conduit) to an input bus bar 114 which is electrically connected to an input electrode 116. Input electrode 116 is in contact with molten glass 101 which is resistively heated by the input current, as shown by symbol 105. To complete the electrical circuit, output current (shown by arrow 106) traverses output electrode 126, output bus bar 124, and output conductor 121 to the transformer 103, which are respectively electrically connected in a manner similar to that described above for the input components.

Figure 2:
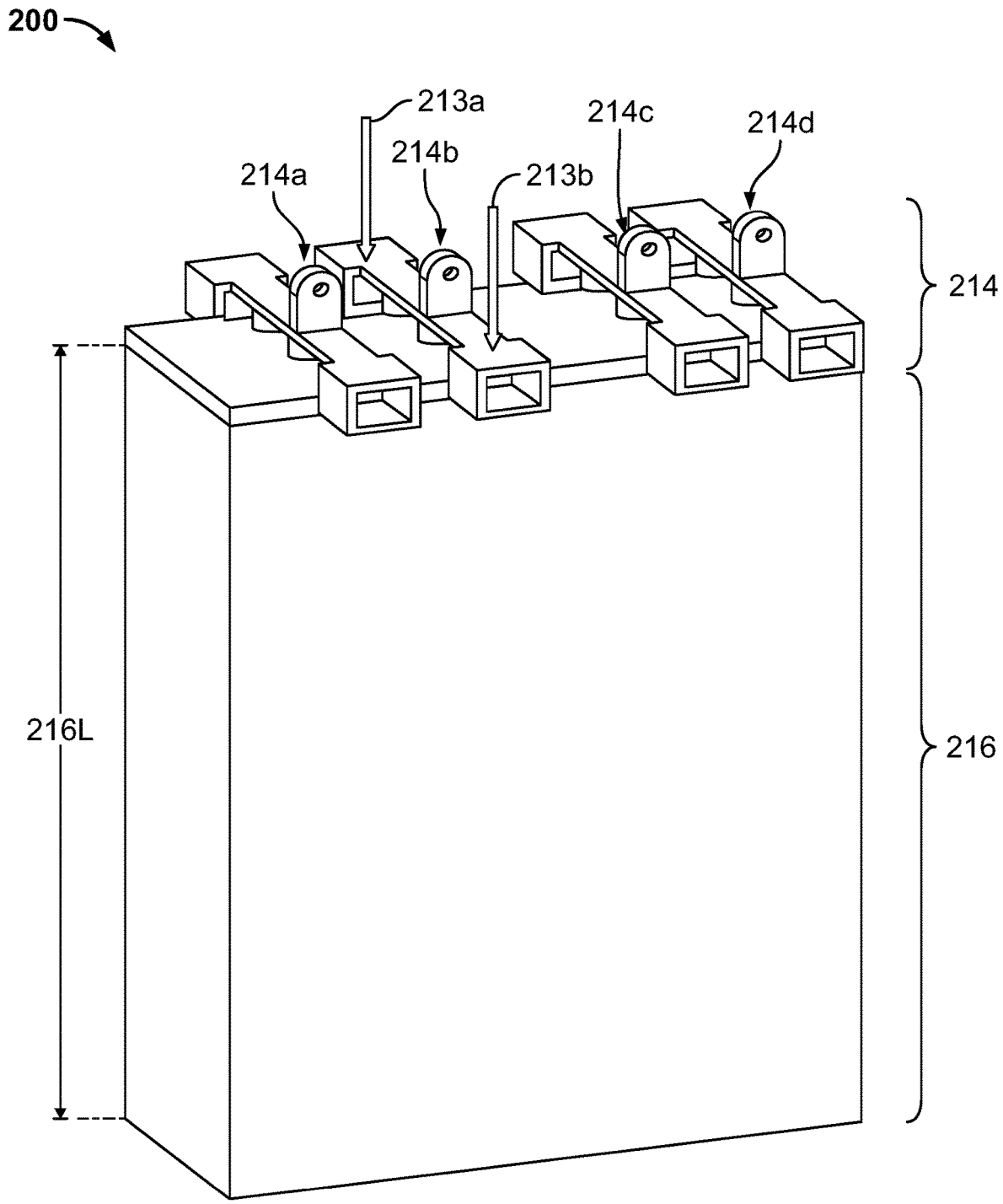
FIG. 2 is a simplified illustration of a typical arrangement of a bus bar and electrode.

Now turning to FIG. 2, a typical prior art exemplary arrangement of a bus bar 214 and electrode 216 for use with glass melt tank arrangement 100 is shown. In an embodiment, the input and output bus bar/electrode arrangements are substantially the same, so only one will be described here. The electrode 216 (which may correspond to either, or both, of the electrodes 116 and 126 in FIG. 1) is primarily comprised of tin and typically is between about 36 inches (at the beginning of electrode life) and about 6 inches (at the end of electrode life) in length, shown as 216L, due to erosion of the electrode during operation. The bus bar 214 is disposed at one end of the length of the electrode 216 while the opposite end, or a portion of the opposite end, of the length of the electrode is in contact with molten glass 101 in glass melt tank 102 as shown in FIG. 1. During operation of the glass melt tank arrangement 100, the electrode 216 is pushed into the glass melt tank 102 by the application of a force on the bus bar 214, as schematically and/or figuratively shown by arrows 213a and 213b. Those of skill in the art will understand that arrows 213a and 213b are simple representations of force application and that the disclosure is not necessarily limited to these two point forces and that the forces may be, as a non-limiting example, distributed forces on the sides of the bus bar to push the electrode 216 into the glass melt tank 102. Thus, the bus bar 214 should be robust enough to maintain its configuration and operation during application of the force represented by arrows 213a and 213b.

Typically, the worst-case thermal condition for the bus bar 214 is at the end of electrode life where the electrode 216 is about 6 inches long since the bus bar will then be in a position relatively close to the glass melt tank 102 and therefore exposed to an increased heat load from the glass melt tank.

A typical bus bar 214 has two or more connection points to electrically connect the bus bar to the conductors (either input conductors 111 or output conductors 121, as shown in FIG. 1, but not to both input and output conductors simultaneously). In the arrangement shown in FIG. 2, bus bar 214 has four connection points, 214a, 214b, 214c, and 214d. Each of these connection points may be connected to a conductor to carry current to (or each may be connected to carry current from) the current source 103, as described above. One or more of the connection points 214a, 214b, 214c, and 214d on bus bar 214 may be electrically isolated from the other connection points on the bus bar such that failure of a connection point may result in degraded operation due to, for example, the affected portion of the bus bar receiving reduced, or no, current from (or to) the current source 103 and/or one or more of the remaining operational connection points receiving an increased current flow thereby pushing it/them closer to its/their thermal operating limits, such as 500° C. or 660° C. maximum temperature.

Figure 3:
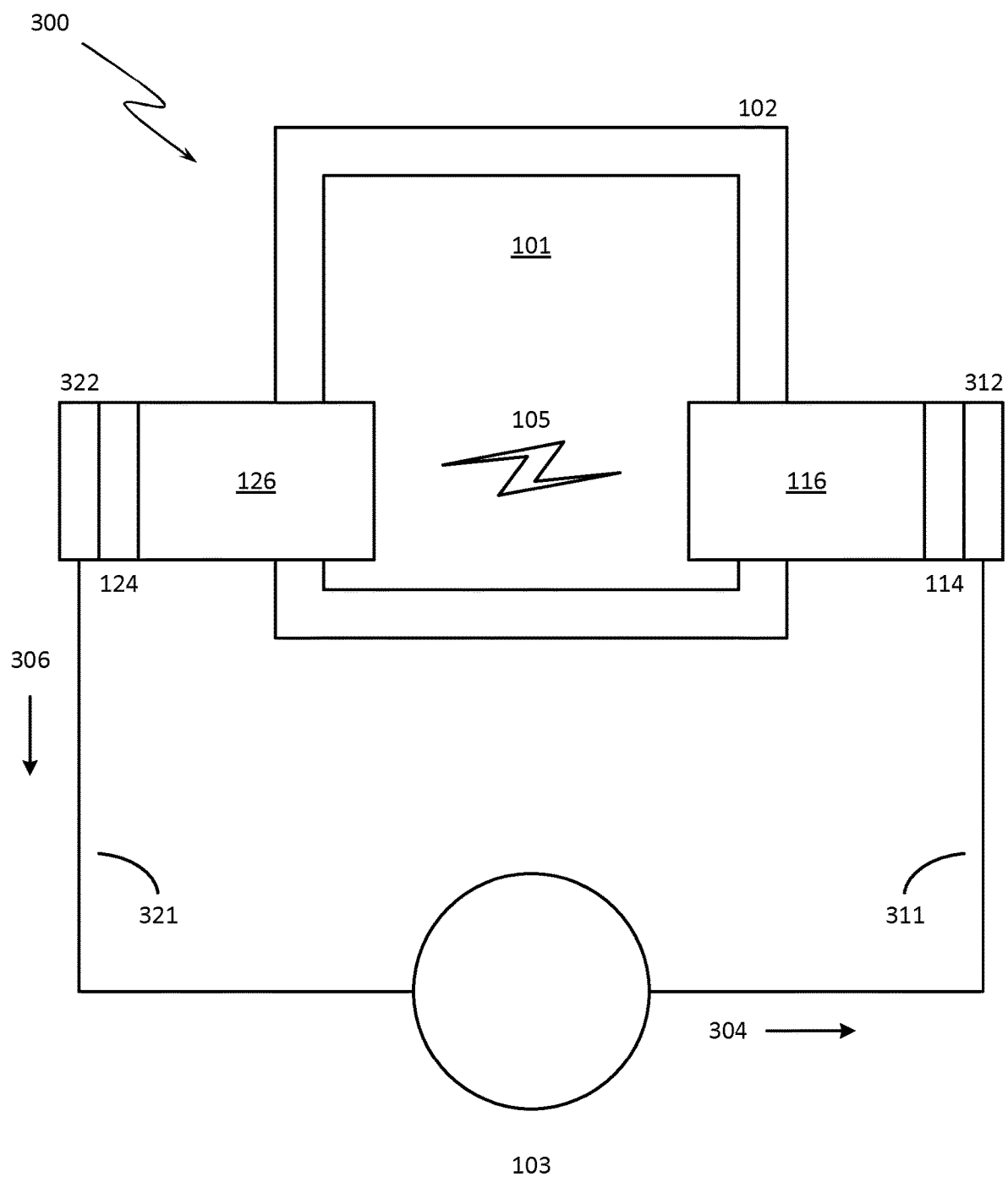
FIG. 3 is a simplified schematic of a glass melt tank arrangement according to an embodiment of the present subject matter.

With attention now drawn to FIG. 3, a simplified schematic of a glass melt tank arrangement 300 according to an embodiment of the present subject matter is presented. Similar to the glass melt tank arrangement 100 of FIG. 1, glass melt tank arrangement 300 includes a volume of molten glass 101 which is contained in a glass melt tank 102, a current source 103, an input bus bar 114 which is electrically connected to an input electrode 116 in contact with molten glass 101 which is resistively heated as shown by symbol 105. Additionally, to complete the electrical circuit, the glass melt tank arrangement 300 includes output electrode 126 and output bus bar 124. In addition to the above-mentioned components, the glass melt tank arrangement 300 includes an input fluid-cooled connection apparatus 312 which is electrically connected to the current source 103 via an input conductor 311. The input fluid-cooled connection apparatus 312 is electrically connected to the input bus bar 114. Similarly, the glass melt tank arrangement 300 includes an output fluid-cooled connection apparatus 322 which is electrically connected to the current source 103 via an output conductor 321. The input fluid-cooled connection apparatus 322 is electrically connected to the output bus bar 124. Thus, input current (shown by arrow 304) flows from the current source 103 via the input conductor 311 to the input fluid-cooled connection apparatus 312 to the input bus bar 114 which is electrically connected to an input electrode 116 which, in turn, is in contact with molten glass 101 which is resistively heated by the input current, as shown by symbol 105. To complete the electrical circuit, output current (shown by arrow 306) traverses output electrode 126, output bus bar 124, output fluid-cooled connection apparatus 322, and output conductor 321 to the transformer 103, which are respectively electrically connected in a manner similar to that described above for the input components.

In an embodiment, bus bar 114 may be a conventional bus bar 214, as shown in FIG. 2. The bus bar 114 may be primarily comprised of steel, such as stainless steel. In other embodiments, bus bar 114 may be an enhanced version of a conventional bus bar. For example, bus bar 114 may be fluid-cooled (with or without internal baffles), e.g., either the entire bus bar or select portions of the bus bar, such as at one or more of the connection points 214a, 214b, 214c, and/or 214d. As another example, bus bar 114, or portions of the bus bar, may be constructed so as to have more volume thereby reducing the current density through the bus bar or the enhanced portions of the bus bar. The reduced current density will ameliorate the temperature increase due to the increased current flow. Testing has indicated that the connection points 214a, 214b, 214c, and 214d may be the initial failure location(s), or the location(s) which first exceed safe thermal operating parameters, particularly for increased current flows. In an embodiment, one or more connection points 214a, 214b, 214c, and/or 214d may be constructed with additional material to increase the volume of the connection point(s) thereby reducing the current density through the connection point(s). Likewise, the contact area between the input (311) or output (321) conductor to one or more of the connection points 214a, 214b, 214c, and/or 214d may be increased to further reduce the current density. As a further non-limiting example, additional connection points (not shown) may be added to the bus bar 114. As will be understood by those of skill in the art, any one or combination of the above examples may be employed to reduce the maximum temperature experienced by the bus bar 114 due to an increase in the current flow. In an embodiment, the maximum temperature of any point in the bus bar should be kept less than about 450° C., less than about 500° C., less than about 550° C., including all ranges and subranges therebetween. In an embodiment, the maximum temperature of the bus bar should be kept less than about 600° C., less than about 650° C., less than about 660° C., less than about 700° C., including all ranges and subranges therebetween in order to prevent failure of the bus bar.

Figure 4:
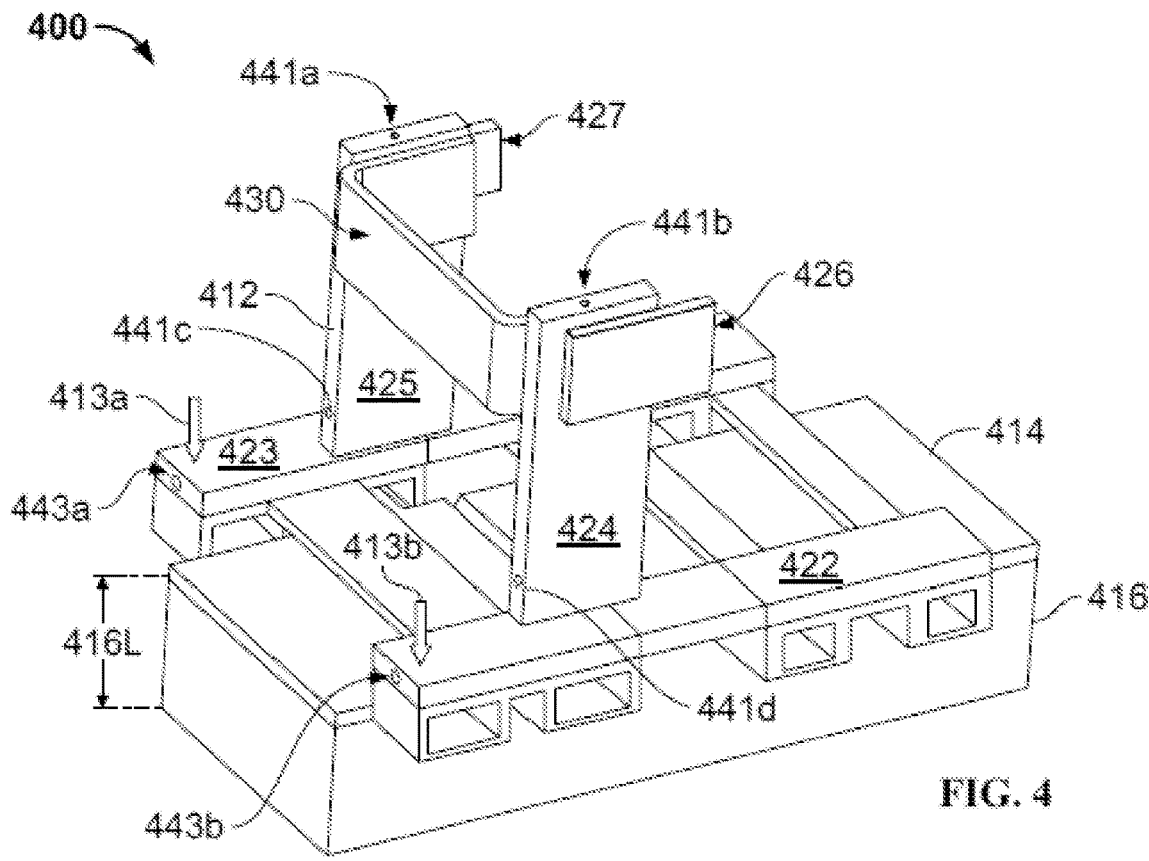
FIG. 4 is a simplified illustration of an arrangement of a fluid-cooled connection apparatus, a bus bar, and an electrode according to an embodiment of the present subject matter.

Considering FIG. 4, an illustration is presented of a non-limiting arrangement 400 of a fluid-cooled connection apparatus 412, a bus bar 414, and an electrode 416 according to an embodiment of the present subject matter. In an embodiment, the input and output fluid-cooled connection apparatus/bus bar/electrode arrangements are substantially the same, so only one will be described here. The electrode 416 (which may correspond to either, or both, of the electrodes 116 and 126 in FIG. 3) is primarily comprised of tin and typically is between about 36 inches (at the beginning of electrode life) and about 6 inches (at the end of electrode life) in length, shown as 416L, due to erosion of the electrode during operation. In FIG. 4, the electrode 416 is shown at or near the end of life. The bus bar 414 is disposed at one end of the length of the electrode 416 while the opposite end, or a portion of the opposite end, of the length of the electrode is in contact with molten glass 101 in glass melt tank 102 as shown and described above with respect to FIG. 1. In an embodiment, a thin silver screen may be placed between the electrode and the bus bar to ensure adequate electrical contact between the two. In other embodiments, the silver screen may be replaced with a similar structure made of one or more other materials with a high electrical conductivity.

Fluid-cooled connection apparatus 412 is connected to the bus bar 414, both physically and electrically, such that the bus bar 414 is positioned between the fluid-cooled connection apparatus 412 and the electrode 416. In an embodiment, the fluid-cooled connection apparatus 412 replaces the bus bar connection points 214a, 214b, 214c, and 214d shown in FIG. 2. As described further below, this design allows for a larger and/or thicker connection area (at connection points 426 and/or 427) between, e.g., the input conductor cables and the fluid-cooled connection apparatus than that afforded by the prior art bus bar connection points 214a, 214b, 214c, and 214d.

In an embodiment, the fluid-cooled connection apparatus 412 is primarily comprised of copper. In other embodiments, the fluid-cooled connection apparatus may be primarily comprised of nickel or some other metal with high electrical conductivity. In other embodiments, the fluid-cooled connection apparatus may be a combination of copper and/or nickel and/or other materials. In an embodiment, cooling fluid flows through an interior portion of at least part of the fluid-cooled connection apparatus 412. In a non-limiting embodiment, cooling fluid flows in through inlets 441a and 441b and out through outlets 441c and 441d, respectively. In an embodiment, the cooling fluid flow may be in a direction opposite to that described above. In other embodiments, the cooling fluid inlets and/or outlets may be placed in positions on the fluid-cooled connection apparatus 412 other than those positions shown in the exemplary embodiment in FIG. 4. In an embodiment, the cooling fluid is water. In other embodiments, the cooling fluid may be a liquid, a gas, an emulsion, a suspension, an oil, and/or a refrigerant. In another embodiment, the flow rate of water through the fluid-cooled connection apparatus 412 is about 0.5 gallons per minute ("gpm"), greater than about 0.5 gallons per minute, between about 0.5 and about 1.0 gallons per minute, greater than about 1.0 gallons per minute, including all ranges and subranges therebetween. In another embodiment, the temperature of the water entering an interior portion of the fluid-cooled connection apparatus 412 is approximately 35° C., is greater than about 25° C., greater than about 30° C., greater than about 35° C., greater than about 40° C., including all ranges and subranges therebetween. In an embodiment, the maximum temperature of any part of the fluid-cooled connection apparatus 412 should be kept less than about 125° C., less than about 150° C., less than about 175° C., less than about 200° C., including all ranges and subranges therebetween.

In a further embodiment, the bus bar 414 is fluid-cooled, either the entire bus bar or select portions of the bus bar. In a non-limiting embodiment, cooling fluid flows in through inlets 443a and 443b and out through respective outlets (not shown). In an embodiment, the cooling fluid flow may be in a direction opposite to that described above. In other embodiments, the cooling fluid inlets and/or outlets may be placed in positions on the bus bar 414 other than those positions shown in the exemplary embodiment in FIG. 4. In an embodiment, the cooling fluid is water. In other embodiments, the cooling fluid may be a liquid, a gas, an emulsion, a suspension, an oil, and/or a refrigerant. In a still further embodiment, a first fluid source supplies fluid for the fluid-cooled connection apparatus 412 and a separate, second fluid source supplies fluid for fluid-cooling the bus bar 414. Alternatively, a single fluid source may supply fluid for the fluid-cooled connection apparatus 412 and for fluid-cooling the bus bar 414. In an embodiment, the flow rate of water through the bus bar 414 is about 0.5 gallons per minute, greater than about 0.5 gallons per minute, between about 0.5 and about 1.0 gallons per minute, greater than about 1.0 gallons per minute, including all ranges and subranges therebetween. In another embodiment, the temperature of the water entering an interior portion of the bus bar 414 is approximately 35° C., is greater than about 25° C., greater than about 30° C., greater than about 35° C., greater than about 40° C., including all ranges and subranges therebetween. In an embodiment, the maximum temperature of any point in the bus bar should be kept less than about 450° C., less than about 500° C., less than about 550° C., including all ranges and subranges therebetween. In an embodiment, the maximum temperature of the bus bar should be kept less than about 600° C., less than about 650° C., less than about 660° C., less than about 700° C., including all ranges and subranges therebetween in order to prevent failure of the bus bar.

During operation of the glass melt tank arrangement 300, the electrode 416 is pushed into the glass melt tank 102 by the application of a force on the fluid-cooled connection apparatus 412, which is transmitted through the bus bar 414 to the electrode 416, as schematically and/or figuratively shown by arrows 413a and 413b. Those of skill in the art will understand that arrows 413a and 413b are simple representations of force application and that the disclosure is not necessarily limited to these two point forces and that the forces may be, as a non-limiting example, distributed forces on the sides of the fluid-cooled connection apparatus to ultimately push the electrode 416 into the glass melt tank 102. In an embodiment, the forces represented by arrows 413a and 413b may be applied anywhere to the fluid-cooled connection apparatus and/or anywhere to the bus bar 414 and the disclosure is not limited to the arrangement shown in either FIG. 2 or FIG. 4. Thus, the fluid-cooled connection apparatus 412 and the bus bar 414 should each be physically robust in order to maintain their respective configurations and operations during application of the force represented by arrows 413a and 413b.

The arrangement 400 of a fluid-cooled connection apparatus 412, a bus bar 414, and an electrode 416 is robust enough to allow operation with high currents, such as greater than about 5000 A, greater than about 8000 A, and greater than about 10,000 A, including all ranges and subranges therebetween.

In an embodiment, the fluid-cooled connection apparatus 412 may comprise a first portion 422 secured to a first area of the bus bar 414 which may be located, but is not limited to, near a longitudinal edge of the bus bar 414, and a second portion 423 secured to a second area of the bus bar 414 which may be located, but is not limited to, near an opposing longitudinal edge of the bus bar 414. In an embodiment, the first and second areas of the bus bar 414 are spaced apart from each other, although it is contemplated that in an embodiment the first and second portions of the fluid-cooled connection apparatus 412 may abut. The fluid-cooled connection apparatus 412 may further comprise a first connection element 424 secured at one end to the first portion 422 of the fluid-cooled connection apparatus 412, and a second connection element 425 secured at one end to the second portion 423 of the fluid-cooled connection apparatus 412. Connected to the opposite ends of the first and second connection elements 424 and 425 are, respectively, first and second connection points 426 and 427. The first and second connection points 426 and 427 are electrically connected to the current source 103 via input (or output) conductor 311 (321) shown in FIG. 3, which, in an embodiment, may be one or more electrical cables. In some embodiments, the first and second connection elements 424 and 425 may be spaced apart by a distance greater than about 6 inches, greater than about 9 inches, greater than about 12 inches, greater than about 18 inches, including all ranges and subranges therebetween.

In an embodiment, a cross-connect strut 430 is disposed between the first and second connection elements 424 and 425 near the first and second connection points 426 and 427 such that one end of the cross-connect strut 430 is attached to the first connection element 424 and the other end of the cross-connect strut 430 is attached to the second connection element 425. Alternatively, the cross-connect strut 430 may be attached to the first and second connection points 426 and 427. In an embodiment, the cross-connect strut 430 is spaced apart from the first and second portions 422 and 423 of the fluid-cooled connection apparatus 412. The cross-connect strut 430 also acts as a safeguard in the event of a failure, such as, for example, a failure of either of the first or second connection points 426 or 427. As a non-limiting example, in the event of a failure of the first connection point 426 (or the conductor carrying current to or from the first connection point), the cross-connect strut 430 will be able to carry current from the second connection point 427 to the first connection element 424, thereby maintaining a relatively balanced current flow into the bus bar 414 and/or mitigating or preventing an increased current density and temperature in the fluid-cooled connection apparatus 412 or bus bar 414. A similar scenario applies in the event of a failure of the second connection point 427.

Figure 5:
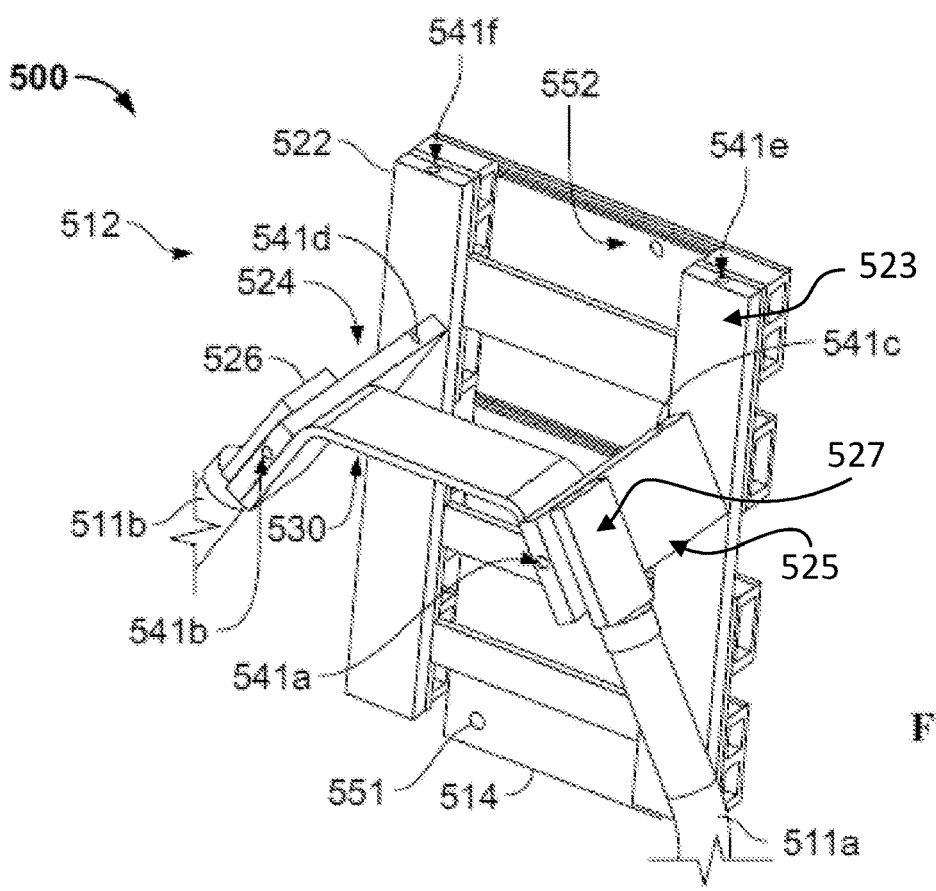
FIG. 5 is a simplified illustration of an arrangement of a fluid-cooled connection apparatus and a bus bar according to an embodiment of the present subject matter.

Now considering FIG. 5, an illustration is presented of a non-limiting arrangement 500 of a fluid-cooled connection apparatus 512 and a bus bar 514 according to an embodiment of the present subject matter. The fluid-cooled connection apparatus 512 may correspond to either, or both, of the fluid-cooled connection apparatuses 312 and 322 in FIG. 3. Likewise, the bus bar 514 may correspond to either, or both, of the bus bars 114 and 124 in FIG. 3.

Fluid-cooled connection apparatus 512 is connected to the bus bar 514, both physically and electrically, such that the bus bar 514 is positioned between the fluid-cooled connection apparatus 512 and the electrode (not shown). In an embodiment, a thin silver screen may be placed between the electrode and the bus bar to ensure adequate electrical contact between the two. In an embodiment, the fluid-cooled connection apparatus 512 is primarily comprised of copper. In other embodiments, the fluid-cooled connection apparatus may be primarily comprised of nickel or some other metal with high electrical conductivity. In other embodiments, the fluid-cooled connection apparatus may be a combination of copper and/or nickel and/or other materials.

In an embodiment, the fluid-cooled connection apparatus 512 may comprise a first portion 522 secured to a first area of the bus bar 514 which may be located, but is not limited to, near a longitudinal edge of the bus bar 514, and a second portion 523 secured to a second area of the bus bar 514 which may be located, but is not limited to, near an opposing longitudinal edge of the bus bar 514. In an embodiment, the first and second areas of the bus bar 514 are spaced apart from each other, although it is contemplated that in an embodiment the first and second portions of the fluid-cooled connection apparatus 512 may abut. The fluid-cooled connection apparatus 512 may further comprise a first connection element 524 secured at one end to the first portion 522 of the fluid-cooled connection apparatus 512, and a second connection element 525 secured at one end to the second portion 523 of the fluid-cooled connection apparatus 512. Connected to the opposite ends of the first and second connection elements 524 and 525 are, respectively, first and second connection points 526 and 527. The first and second connection points 526 and 527 are electrically connected to the current source 103 via conductors 511$a$ and 511$b$, respectively. Conductors 511$a$ and 511$b$ correspond to either of the input conductor 311 or the output conductor 321, but not both simultaneously, in FIG. 3. In an embodiment, the conductors 511$a$ and 511$b$ are water-cooled cables. In some embodiments, the first and second connection elements 524 and 525 may be spaced apart by a distance greater than about 6 inches, greater than about 9 inches, greater than about 12 inches, greater than about 18 inches, including all ranges and subranges therebetween.

In an embodiment, a cross-connect strut 530 is disposed between the first and second connection elements 524 and 525 near the first and second connection points 526 and 527 such that one end of the cross-connect strut 530 is attached to the first connection element 524 and the other end of the cross-connect strut 530 is attached to the second connection element 525. Alternatively, the cross-connect strut 530 may be attached to the first and second connection points 526 and 527. In an embodiment, the cross-connect strut 530 is spaced apart from the first and second portions 522 and 523 of the fluid-cooled connection apparatus 512.

In an embodiment, cooling fluid flows through an interior portion of at least part of the fluid-cooled connection apparatus 512. In the non-limiting embodiment shown in FIG. 5, cooling fluid flows into the fluid-cooled connection apparatus 512 via inlets 541$a$ and 541$b$, through the first and second connection elements 525 and 524, and exiting via outlets 541$c$ and 541$d$, respectively. In an embodiment, the cooling fluid may exit via outlets 541$e$ and 541$f$, respectively (either separately or in addition to outlets 541$c$ and 541$d$). In an embodiment, the cooling fluid flow may be in a direction opposite to that described above. In other embodiments, the cooling fluid inlets and/or outlets may be placed in positions on the fluid-cooled connection apparatus 512 other than those positions shown in the exemplary embodiment in FIG. 5. In the above-described embodiment, there is no cooling fluid flow through the cross-connect strut 530. In another embodiment, the cross-connect strut 530 is designed to accept cooling fluid flow and to cross-connect the cooling fluid pathways between the first and second connection elements 525 and 524. In this arrangement, in an embodiment cooling fluid may enter the fluid-cooled connection apparatus 512 through one of inlets 541$a$ or 541$b$. In an embodiment, the cooling fluid flow may be in a direction opposite to that described above.

In an embodiment, the cooling fluid is water. In other embodiments, the cooling fluid may be a liquid, a gas, an emulsion, a suspension, an oil, and/or a refrigerant. In another embodiment, the flow rate of water through the fluid-cooled connection apparatus 512 is about 0.5 gallons per minute, greater than about 0.5 gallons per minute, between about 0.5 and about 1.0 gallons per minute, greater than about 1.0 gallons per minute, including all ranges and subranges therebetween. In another embodiment, the temperature of the water at one or both of the inlets 541$a$ and 541$b$ is approximately 35° C., is greater than about 25° C., greater than about 30° C., greater than about 35° C., greater than about 40° C., including all ranges and subranges therebetween. In an embodiment, the maximum temperature of any part of the fluid-cooled connection apparatus 512 should be kept less than about 125° C., less than about 150° C., less than about 175° C., less than about 200° C., including all ranges and subranges therebetween.

In a further embodiment, the bus bar 514 is fluid-cooled, either the entire bus bar or select portions of the bus bar. In the non-limiting embodiment shown in FIG. 5, cooling fluid flows into the bus bar 514 via inlet 551, through the bus bar 514, exiting the bus bar via outlet 552. In an embodiment, the cooling fluid flow may be in a direction opposite to that described above. In other embodiments, multiple inlets and/or multiple outlets (not shown for clarity) may be used for bus bar 514. In some embodiments, there may be a single inlet/outlet pair for a specific section of the bus bar 514 and a separate inlet/outlet pair for a separate section of the bus bar 514. In other embodiments, the multiple inlet/outlets carry cooling fluid that can flow throughout the fluid-cooled portion(s) of the bus bar 514. In an embodiment, cooling fluid is routed through portions of both the fluid-cooled connection apparatus 512 and the bus bar 514.

In an embodiment, the cooling fluid is water. In other embodiments, the cooling fluid may be a liquid, a gas, an emulsion, a suspension, an oil, and/or a refrigerant. In another embodiment, the flow rate of water through the bus bar 514 is about 0.5 gallons per minute, greater than about 0.5 gallons per minute, between about 0.5 and about 1.0 gallons per minute, greater than about 1.0 gallons per minute, including all ranges and subranges therebetween. In another embodiment, the temperature of the water at the inlet 551 is approximately 35° C., is greater than about 25° C., greater than about 30° C., greater than about 35° C., greater than about 40° C., including all ranges and subranges therebetween. In an embodiment, the maximum temperature of any point in the bus bar 514 should be kept less than about 450° C., less than about 500° C., less than about 550° C., including all ranges and subranges therebetween. In an embodiment, the maximum temperature of the bus bar should be kept less than about 600° C., less than about 650° C., less than about 660° C., less than about 700° C., including all ranges and subranges therebetween in order to prevent failure of the bus bar.

In a still further embodiment, a first fluid source supplies fluid for the fluid-cooled connection apparatus 512 and a separate, second fluid source supplies fluid for fluid-cooling the bus bar 514. Alternatively, a single fluid source may supply fluid for the fluid-cooled connection apparatus 512 and for fluid-cooling the bus bar 514.

During operation of the glass melt tank arrangement 300, the electrodes (not shown for clarity), such as electrode 416, is pushed into the glass melt tank 102 by the application of a force on the fluid-cooled connection apparatus 512, which is transmitted through the bus bar 514 to the electrode 416, as described above with respect to FIG. 4. Thus, the fluid-cooled connection apparatus 512 and the bus bar 514 should be robust enough to maintain their respective configurations and operations during application of that force. Additionally, the arrangement 500 of a fluid-cooled connection apparatus 512 and bus bar 514 is robust enough to allow operation with high currents, such as greater than about 5000 A, greater than about 8000 A, and greater than about 10,000 A, including all ranges and subranges therebetween.

Figure 6:
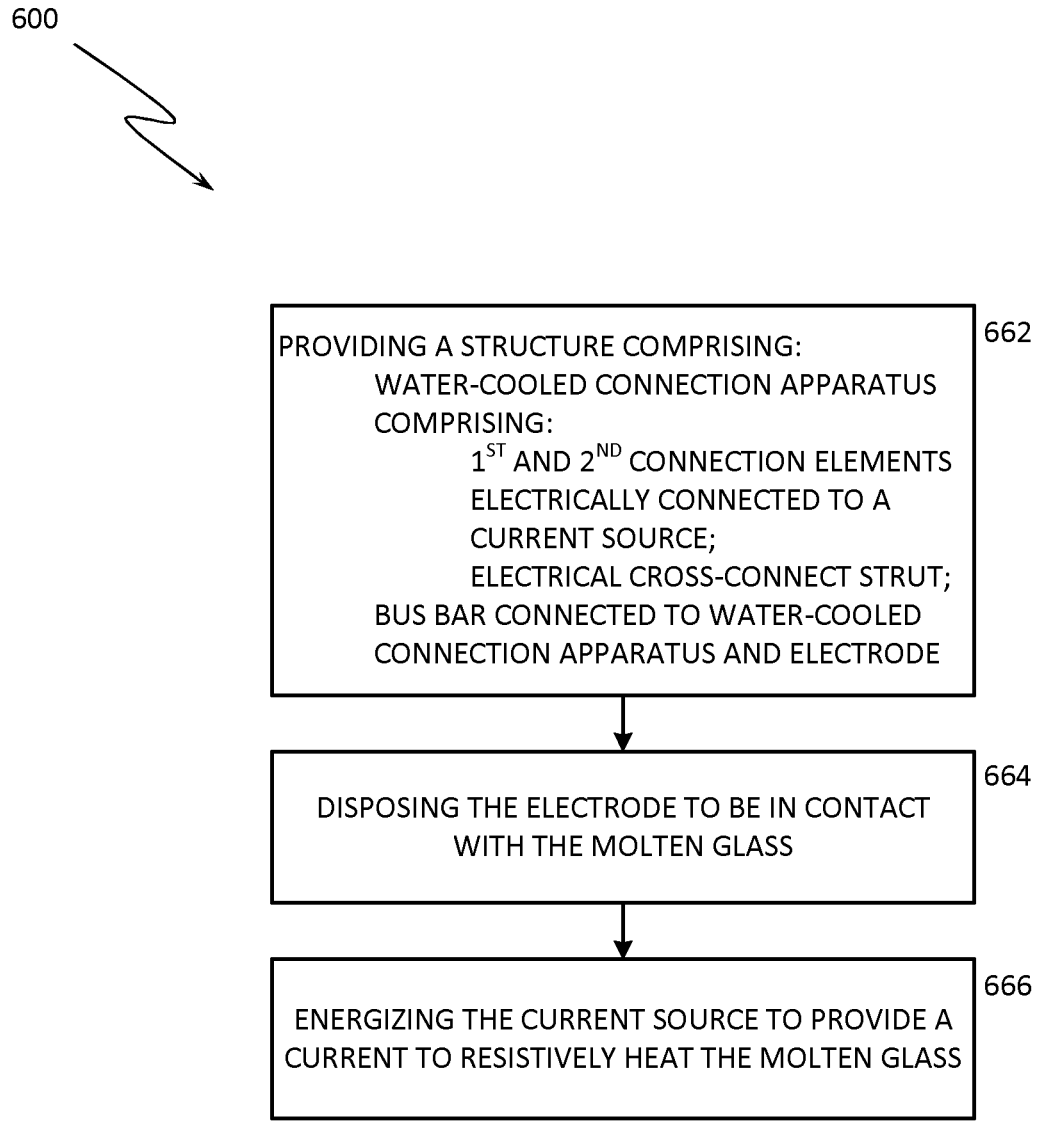
FIG. 6 is a high-level block diagram illustrating a method for providing electrical current to molten glass in a glass melting tank according to an embodiment of the present subject matter.

FIG. 6 illustrates a high-level block diagram for a method for providing electrical current to molten glass in a glass melting tank according to an embodiment of the present subject matter. At block 662, a structure is provided where the structure comprises a fluid-cooled connection apparatus, which comprises a first connection element electrically connected to a current source and a second connection element electrically connected to the current source, wherein said first and second connection elements are spaced apart from each other; and an electrical cross-connect strut having a first end secured to said first connection element and a second end secured to said second connection element. The structure further comprises a bus bar electrically connected to the fluid-cooled connection apparatus and to an electrode. At block 664, the electrode is disposed so as to be in contact with the molten glass. At block 666, the current source is energized to provide a current to the molten glass via the structure and the electrode for heating the molten glass through resistive heating.

Various embodiments of the present subject matter will be further clarified by the following examples. As a baseline for thermal testing, a thermal simulation model was created to predict temperatures and a temperature profile for various bus bar designs. The model was then run using an existing bus bar design, such as bus bar 214 in FIG. 2. The model's predicted temperature results were compared with actual results from a test run of an existing bus bar in operation, such as bus bar 214, where the actual temperatures were recorded with an infrared thermometer. The model's predicted results agreed well with the actual temperatures recorded.

Example 1

The thermal simulation model was run with a water-cooled bus bar design using four different current flows: 1700 A, 2600 A, 3000 A, 5000 A. For each run, the bus bar was modeled to have four connection points, each carrying ¼ of the total current flow. The tin electrode was modeled to be 36 inches long, i.e., at the beginning of the electrode's life and therefore the best-case scenario for temperatures at the bus bar. The results of the simulation runs appear in Table 1 below:

TABLE 1

| MODEL PARAMETERS | 1700 A | 2600 A | 3000 A | 5000 A |
|---|---|---|---|---|
| Amps/connection point (A) | 425 | 650 | 750 | 1250 |
| Max Current Density (A/mm²) | 1.05 | 1.61 | 1.86 | 3.09 |
| Avg. Current Density at Tin/Glass Surface (A/mm²) | 0.0092 | 0.014 | 0.016 | 0.027 |
| Max Bus Bar Temp (° C.) | 112 | 228 | 293 | 663 |
| Cooling Water Inlet Temp (° C.) | 35 | 35 | 35 | 35 |
| Cooling Water Outlet Temp (° C.) | 37.17 | 37.32 | 37.36 | 38.30 |

The max bus bar temperature of 663° C. for the 5000 A test exceeds the design criteria for the bus bar used in this test, which in this instance is 500° C. Therefore, the bus bar design used for this test will not be suitable for carrying a 5000 A current.

Example 2

The thermal simulation model was run once with an existing bus bar design having four same-sized connection points (referred to herein as "connection bars") where the volume of each connection bar is 2.78 in³. The thermal simulation model was run a second time with generally the same bus bar design but where each of the four connection bars had a volume of 11.12 in³. For each of these two runs, the tin electrode was modeled to be 6 inches long, i.e., at the end of the electrode's life and therefore the worst-case scenario for temperatures at the bus bar. The results of the simulation runs appear in Table 2 below:

TABLE 2

| MODEL PARAMETERS | 5000 A | 5000 A |
|---|---|---|
| Number of Connection Points | 4 | 4 |
| Amps/Connection Bar (A) | 1250 | 1250 |
| Cable/Connection Bar Contact Area (in²) | 1.41 | 1.41 |
| Connection Bar Volume (in³) | 2.78 | 11.12 |
| Max Bus Bar Temp (° C.) | 672 | 445 |
| Max Connection Bar Temp (° C.) | 672 | 267 |

For the first run (existing bus bar design) the maximum bus bar temperature and the maximum connection bar temperature of 672° C. exceeds the design criteria for the bus bar used in this test, which in this instance is 500° C. For the second run (modified bus bar design) the maximum bus bar temperature of 445° C. and the maximum connection bar temperature of 267° C. are each below the design criteria of 500° C. Therefore, the existing bus bar design used for the first run will not be suitable for carrying a 5000 A current. However, the modified bus bar design used for the second run will be suitable for carrying a 5000 A current.

Example 3

The thermal simulation model was run with a water-cooled connection apparatus (as described above), a bus bar, and a tin electrode which was modeled to be 6 inches long, i.e., at the end of the electrode's life and therefore the worst-case scenario for temperatures at the bus bar. In this example, the bus bar includes a water-cooled first plate and a water-cooled second plate substantially adjacent to each other. The two water-cooled plates are substantially adjacent to the electrode where the "bottom" plate is closer to the electrode than the "top" plate. In each of the two runs, the current was modeled to be 5000 A. In the first run, two active cables are connected to the water-cooled connection apparatus so that each cable carries 2500 A. In the second run, only one active cable is used, which carries all 5000 A. Additionally, since the electrode is only 6 inches long, the water-cooled connection apparatus and the bus bar are each exposed to very high ambient temperatures, ranging from about 500° C. to about 700° C. Furthermore, the flow rate of cooling water through the water-cooled connection apparatus is set between about 0.5 gpm to about 1.0 gpm. The results of the simulation runs appear in Table 3 below:

TABLE 3

| MODEL PARAMETERS | 5000 A | 5000 A |
| --- | --- | --- |
| Electrode Length (in) | 6 | 6 |
| No. of Active Cables | 2 | 1 |
| Amps/Cable (A) | 2500 | 5000 |
| Max Temp of Water-cooled Connection Apparatus (° C.) | 121 | 122 |
| Max Temp at Bus Bar/Electrode Interface (° C.) | 260 | 260 |
| Max Temp of Bus Bar (° C.) | 409 | 409 |
| Cooling Water Inlet Temp - Water-cooled Connection Apparatus (° C.) | 35 | 35 |
| Cooling Water Inlet Temp - Bus Bar (° C.) | 35 | 35 |
| Cooling Water Outlet Temp - Top Plate of Bus Bar (° C.) | 48 | 48 |
| Cooling Water Outlet Temp - Bottom Plate of Bus Bar (° C.) | 53 | 53 |
| Max Current Density (A/mm$^2$) | 5.3 | 6.8 |
| Avg Current Density Tin/Glass Surface (A/mm$^2$) | 0.0217 | 0.0217 |

For each of the two runs the maximum bus bar temperature of 409° C. and the maximum water-cooled connection apparatus temperature of 121° C. (first run) and 122° C. (second run) are each below the design criteria of 500° C. for the bus bar and 200° C. for the water-cooled connection apparatus. Therefore, the water-cooled connection apparatus and bus bar design used for the first and second runs is suitable for carrying a 5000 A current.

Example 4

The thermal simulation model was run with a water-cooled connection apparatus, a bus bar, and a tin electrode as described above for Example 3. In the first run, the current was modeled to be 8000 A. In the second run, the current was modeled to be 10,000 A. In both runs, only one active cables is connected to the water-cooled connection apparatus which carries all of the current. Additionally, since the electrode is only 6 inches long, the water-cooled connection apparatus and the bus bar are each exposed to very high ambient temperatures, ranging from about 500° C. to about 700° C. Furthermore, the flow rate of cooling water through the water-cooled connection apparatus is set between about 0.5 gpm to about 1.0 gpm. The results of the simulation runs appear in Table 4 below:

TABLE 4

| MODEL PARAMETERS | 8000 A | 10,000 A |
| --- | --- | --- |
| Electrode Length (in) | 6 | 6 |
| No. of Active Cables | 1 | 1 |
| Amps/Cable (A) | 8000 | 10,000 |
| Max Temp of Water-cooled Connection Apparatus (° C.) | 126 | 131 |
| Max Temp at Bus Bar/Electrode Interface (° C.) | 261 | 266 |
| Max Temp of Bus Bar (° C.) | 411 | 413 |
| Cooling Water Inlet Temp - Water-cooled Connection Apparatus (° C.) | 35 | 35 |
| Cooling Water Inlet Temp - Bus Bar (° C.) | 35 | 35 |
| Cooling Water Outlet Temp - Top Plate of Bus Bar (° C.) | 49 | 49 |
| Cooling Water Outlet Temp - Bottom Plate of Bus Bar (° C.) | 53 | 55 |
| Max Current Density (A/mm$^2$) | 11 | 14 |
| Avg Current Density Tin/Glass Surface (A/mm$^2$) | 0.035 | 0.043 |

For each of the two runs the maximum bus bar temperature of 411° C. (first run) and 413° C. (second run) and the maximum water-cooled connection apparatus temperature of 126° C. (first run) and 131° C. (second run) are each below the design criteria of 500° C. for the bus bar and 200° C. for the water-cooled connection apparatus. Therefore, the water-cooled connection apparatus and bus bar design used for the first and second runs is suitable for carrying up to at least a 10,000 A current.

In an embodiment, an assembly provides electrical current to molten glass in a glass melting tank, the assembly comprising a structure which comprises a fluid-cooled connection apparatus having a first connection element electrically connected to a current source and a second connection element electrically connected to the current source, wherein the first and second connection elements are spaced apart from each other, and an electrical cross-connect strut having a first end secured to the first connection element and a second end secured to the second connection element. The structure further comprises a bus bar electrically connected to the fluid-cooled connection apparatus and to an electrode, where the electrode is disposed so as to be in contact with the molten glass, and where the current source provides a current to the molten glass via the structure and the electrode for heating the molten glass through resistive heating.

In another embodiment, the bus bar is fluid-cooled. In yet another embodiment, a first fluid source supplies fluid for the fluid-cooled connection apparatus and a second fluid source supplies fluid for the fluid-cooled bus bar. In still another embodiment, the fluid-cooled connection apparatus further comprises a first portion secured to a first area of the bus bar, and a second portion secured to a second area of the bus bar, where the first and second areas of the bus bar are spaced apart from each other. In yet still another embodiment, the first connection element is secured to the first portion of the fluid-cooled connection apparatus and the second connection element is secured to the second portion of the fluid-cooled connection apparatus. In a further embodiment, the first connection element is electrically connected to the current source via a first cable and the second connection element is electrically connected to a second current source via a second cable. In yet a further embodiment, the first connection element is electrically connected to the current source via a first cable and the second connection element is electrically connected to the current source via a second cable. In still a further embodiment, a point of connection of the first cable to the first connection element is spaced apart from the first portion of the fluid-cooled connection apparatus. In yet still a further embodiment, a point of connection of the second cable to the second connection element is spaced apart from the second portion of the fluid-cooled connection apparatus. In an even further embodiment, the first and second connection elements are spaced apart by at least six inches. In yet an even further embodiment, the fluid-cooled connection apparatus is comprised primarily of copper, and/or the bus bar is primarily comprised of steel, and/or the electrode is primarily comprised of tin. In still even further embodiments, the current source supplies at least about 3000 amps of current, the current source supplies at least about 5000 amps of current, the current source supplies at least about 8000 amps of current, the current source supplies at least about 10,000 amps of current.

In an embodiment, the above-described assembly further comprises cooling fluid flowing through an interior portion of the fluid-cooled connection apparatus. In a further embodiment, a flow rate of the cooling fluid is between about 0.5 gallons per minute and about 1.0 gallons per minute. In a still further embodiment, a temperature of the cooling fluid entering the interior portion of the fluid-cooled connection apparatus is approximately 35° C.

In an embodiment, for the above-described assembly the current source supplies at least about 10,000 amps of current, the bus bar is fluid-cooled, the electrode is about 6 inches in length, and a maximum temperature of the bus bar is less than about 450° C.

In an embodiment, a method is provided for providing electrical current to molten glass in a glass melting tank, the method comprising providing a structure which comprises a fluid-cooled connection apparatus having a first connection element electrically connected to a current source and a second connection element electrically connected to the current source, wherein the first and second connection elements are spaced apart from each other, and an electrical cross-connect strut having a first end secured to the first connection element and a second end secured to the second connection element. The structure further comprises a bus bar electrically connected to the fluid-cooled connection apparatus and to an electrode. The method further includes disposing the electrode so as to be in contact with the molten glass, and energizing the current source to provide a current to the molten glass via the structure and the electrode for heating the molten glass through resistive heating. In a further embodiment, the current source supplies at least about 10,000 amps of current, the bus bar is fluid-cooled, the electrode is about 6 inches in length, and a maximum temperature of the bus bar is less than about 450° C.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While some embodiments of the present subject matter have been described, it is to be understood that the embodiments described are illustrative only and that the scope of the invention is to be defined solely by the appended claims when accorded a full range of equivalents, many variations and modifications naturally occurring to those of skill in the art from a perusal hereof

We claim:

1. An assembly for providing electrical current to molten glass in a glass melting tank, comprising:
a structure comprising:
a fluid-cooled connection apparatus comprising:
a first connection element and a second connection element, said first and second connection elements in electrical communication with a current source and spaced apart from each other; and
an electrical cross-connect strut having a first end secured to said first connection element and a second end secured to said second connection element;
and
a bus bar in electrical communication with the fluid-cooled connection apparatus and an electrode;
said electrode disposed so as to be in contact with the molten glass; and
wherein the current source provides a current to the molten glass via the structure and the electrode for heating the molten glass through resistive heating.

2. The assembly of claim 1 wherein the fluid is water.

3. The assembly of claim 1 wherein the fluid is selected from the group consisting of: a liquid, a gas, an emulsion, a suspension, an oil, a refrigerant, and combinations thereof.

4. The assembly of claim 1 wherein the bus bar is fluid-cooled.

5. The assembly of claim 4 wherein the fluid is water.

6. The assembly of claim 4 wherein a first fluid source supplies fluid for the fluid-cooled connection apparatus and a second fluid source supplies fluid for the fluid-cooled bus bar.

7. The assembly of claim 1 wherein said fluid-cooled connection apparatus further comprises:
a first portion secured to a first area of the bus bar; and
a second portion secured to a second area of the bus bar, wherein said first and second areas of the bus bar are spaced apart from each other.

8. The assembly of claim 7 wherein the first connection element is secured to the first portion of the fluid-cooled connection apparatus and the second connection element is secured to the second portion of the fluid-cooled connection apparatus.

9. The assembly of claim 8 wherein the first connection element is electrically connected to the current source via a first cable and the second connection element is electrically connected to a second current source via a second cable.

10. The assembly of claim 8 wherein the first connection element is electrically connected to the current source via a first cable and the second connection element is electrically connected to the current source via a second cable.

11. The assembly of claim 10 wherein a point of connection of the first cable to the first connection element is spaced apart from the first portion of the fluid-cooled connection apparatus.

12. The assembly of claim 11 wherein a point of connection of the second cable to the second connection element is spaced apart from the second portion of the fluid-cooled connection apparatus.

13. The assembly of claim 1 wherein the first and second connection elements are spaced apart by at least six inches.

14. The assembly of claim 1 wherein the fluid-cooled connection apparatus is comprised primarily of copper.

15. The assembly of claim 1 wherein the bus bar is primarily comprised of steel.

16. The assembly of claim 1 wherein the electrode is primarily comprised of tin.

17. The assembly of claim 1 wherein the current source supplies at least about 3000 amps of current.

18. The assembly of claim 1 wherein the current source supplies at least about 10,000 amps of current.

19. The assembly of claim 1 further comprising cooling fluid flowing through an interior portion of the fluid-cooled connection apparatus.

20. The assembly of claim 19 wherein the cooling fluid is water having a flow rate between about 0.5 gallons per minute and about 1.0 gallons per minute.

21. The assembly of claim 19 wherein the cooling fluid is water having a temperature entering the interior portion of the fluid-cooled connection apparatus in the range of about 30° C. to about 40° C.

22. The assembly of claim 1 wherein the current source supplies at least about 10,000 amps of current, wherein the bus bar is fluid-cooled, wherein the electrode has a length in the range of about 6 inches to about 9 inches, and wherein a maximum temperature of the bus bar is less than about 450° C.

23. A method for providing electrical current to molten glass in a glass melting tank, the method comprising:
  providing a structure comprising:
    a fluid-cooled connection apparatus comprising:
      a first connection element and a second connection element, said first and second connection elements in electrical communication with a current source and are spaced apart from each other; and
    an electrical cross-connect strut having a first end secured to said first connection element and a second end secured to said second connection element;
  and
  a bus bar in electrical communication with the fluid-cooled connection apparatus and to an electrode;
  disposing the electrode so as to be in contact with the molten glass; and
  energizing the current source to provide a current to the molten glass via the structure and the electrode for heating the molten glass through resistive heating.

24. The assembly of claim 23 wherein the fluid is water.

25. The assembly of claim 23 wherein the fluid is selected from the group consisting of: a liquid, a gas, an emulsion, a suspension, an oil, a refrigerant, and combinations thereof.

26. The method of claim 23 wherein the current source supplies at least about 10,000 amps of current, wherein the bus bar is fluid-cooled, wherein the electrode has a length in the range of about 6 inches to about 9 inches, and wherein a maximum temperature of the bus bar is less than about 450° C.

* * * * *